United States Patent
Raychaudhuri et al.

(10) Patent No.: US 9,927,804 B2
(45) Date of Patent: Mar. 27, 2018

(54) ASSEMBLY TEMPLATE WITH INTEGRATED SENSING NETWORK

(71) Applicant: PALO ALTO RESEARCH CENTER INCORPORATED, Palo Alto, CA (US)

(72) Inventors: Sourobh Raychaudhuri, Mountain View, CA (US); Jeng Ping Lu, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 258 days.

(21) Appl. No.: 15/005,562

(22) Filed: Jan. 25, 2016

(65) Prior Publication Data
US 2017/0212504 A1 Jul. 27, 2017

(51) Int. Cl.
G05B 19/41 (2006.01)
G05B 19/414 (2006.01)

(52) U.S. Cl.
CPC ............... *G05B 19/4142* (2013.01); *G05B 2219/34008* (2013.01)

(58) Field of Classification Search
CPC .................................................... G05B 19/41
See application file for complete search history.

(56) References Cited

U.S. PATENT DOCUMENTS

| | | | |
|---|---|---|---|
| 6,605,453 B2 * | 8/2003 | Ozkan | B01J 19/0046 204/471 |
| 6,687,987 B2 * | 2/2004 | Mayer | B82Y 30/00 257/E21.705 |
| 9,305,807 B2 * | 4/2016 | Whiting | H01L 21/481 |

* cited by examiner

Primary Examiner — William Coleman
(74) Attorney, Agent, or Firm — Marger Johnson (57) ABSTRACT

A microassembler system includes an alignment surface, a two-dimensional array of electrodes adjacent the alignment surface, a sensor network arranged adjacent the array of electrodes, and a control computer electrically connected to the array of electrodes and the sensor network, the control computer to receive signals from the sensor network indicating a position of at least one chiplet and to actuate the electrodes to change the position of the chiplet based upon the signals. A method of assembling chiplets includes receiving, at one of an array of control logic units, a signal from a control computer identifying an assembly location in a block of an assembly template at which a chiplet is to be located, using a sensor to determine a chiplet location of a nearest chiplet, and generating, using electrodes corresponding to the control logic unit, a traveling wave pattern to translate and orient the nearest chiplet to the location.

20 Claims, 8 Drawing Sheets

ASSEMBLY TEMPLATE WITH INTEGRATED SENSING NETWORK

TECHNICAL FIELD

This disclosure relates to microassemblers, more particularly to microassemblers using electrostatic assembly.

BACKGROUND

A microassembler typically consists of a system having a dynamic electrostatic template. A dynamic electrostatic template has a two-dimensional array of voltage electrodes controlled by software to create electric field patterns. The electric field patterns manipulate and align particles or chiplets, suspended in solution, into an assembly.

Some current systems employ cameras paired with microscope optics to provide feedback during the assembly process. This approach requires the camera to resolve a single particle over a large field of view. This typically involves complex optics and multiple cameras. These systems use a great deal of computational power to analyze the images, calibrate them to one another and locate defects in the assembly, to provide actuation information back to the control system. The control system uses this information to manipulate particles that are out of place into the correct orientation and/or location.

Other approaches study impedance data on the electrodes used to perform alignment. This approach tends to have sensitivity to the electrical properties of the particle in question and either requires the ability to detect a very subtle signal, or a separate probing signal. The probing signal may likely interfere with the field forces used to create and hold the assembly in place. In addition, this approach has difficulties in obtaining information about chips that move around the electrode array away from an anticipated alignment site.

The complexity and expense of these approaches give rise to interest in finding new and better approaches to acquiring feedback on the assembly process.

SUMMARY

One embodiment consists of a microassembler system that includes an alignment surface, a two-dimensional array of electrodes adjacent the alignment surface, a sensor network arranged adjacent the array of electrodes, and a control computer electrically connected to the array of electrodes and the sensor network, the control computer to receive signals from the sensor network indicating a position of at least one chiplet and to actuate the electrodes to change the position of the chiplet based upon the signals.

One embodiment consists of a method of assembling chiplets that includes receiving, at one of an array of control logic units, a signal from a control computer identifying an assembly location in a block of an assembly template at which a chiplet is to be located, using a sensor to determine a chiplet location of a nearest chiplet, and generating, using electrodes corresponding to the control logic unit, a traveling wave pattern to translate and orient the nearest chiplet to the location.

DETAILED DESCRIPTION OF THE EMBODIMENTS

A microassembler can used closed-loop feedback to examine the progress of the assembly and dynamically adjust the field pattern on the assembly template using electrodes. This allows the system to complete an incomplete assembly or correct assembly errors resulting in much higher yields. The feedback mechanism should provide information about the current location of the particles or chiplets undergoing assembly as well as when they reach their desired location.

Figure 1:
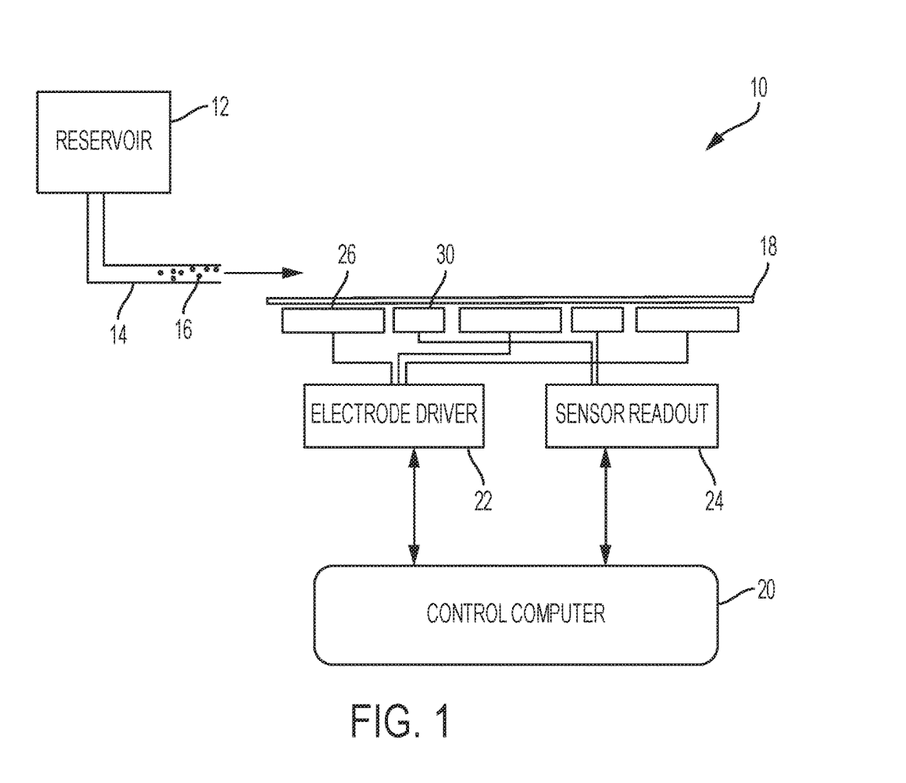
FIG. 1 shows a cross-sectional view of an embodiment of an integrated assembly plane and sensor network.

FIG. 1 shows an embodiment of a microassembler system. The system users a dynamic electrostatic template, comprising an assembly surface 18 having an array of electrodes such as 26 under the control of a control computer 20 through the electrode driver 22. A reservoir 12 of a solution in which are suspended chiplets 16. The solution flows through channel 14 across the surface 18. The chiplets assemble themselves according to the electrostatic template defined according to the programming which applies specific potentials to specific electrodes 26.

Figure 2:
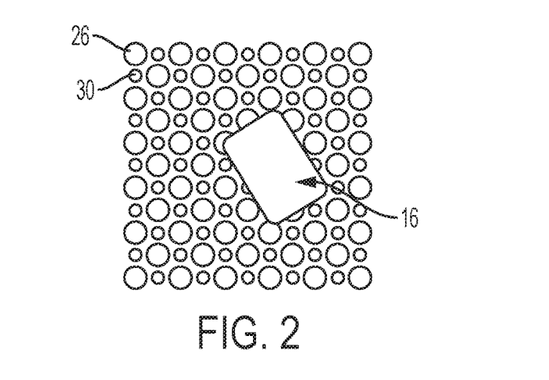
FIG. 2 shows a top view embodiment of a sensor network placed interstitially throughout the assembly electrode array.

In order to provide real-time feedback to the control computer to allow it to adjust the positions of the chiplets with the programming. In the embodiment of FIG. 2, the sensors, such as 30 integrate interstitially with the electrodes such as 26. The sensors may function capacitively to determine when a chip resides above it. Alternatively, the sensor could be optical, such as a photodiode, which can highlight the position of a chiplet 16 when a shadow falls on it. Generally, the chiplet will be larger than the pitch of the sensor network, but the sensor network will still provide useful information as long as the chip size is similar to the pitch of the sensor network. The sensor network comprises an array of sensing elements electrically connected to sensor readout circuitry 24 such as sensing amplifiers, etc. The sensing circuitry communicates with the control computer 20.

Figure 3:
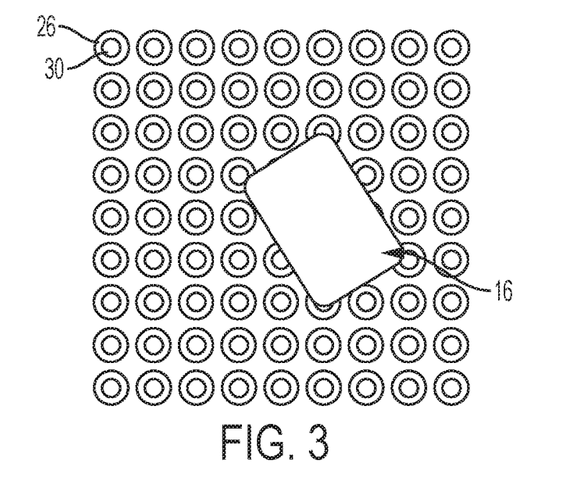
FIG. 3 shows an embodiment of a sensor network placed directly on top of or below the alignment electrodes.

In another embodiment, the sensor network can be placed directly on top or below the alignment electrodes. FIG. 3 shows such an embodiment. In this embodiment, the electrodes may consist of transparent conducting material and optical sensors could reside directly underneath. Alternatively, the alignment electrodes could consist of an opaque material but contain an aperture to allow light to pass through to the optical sensor underneath. In FIG. 3, the aperture coincides with the sensor under the electrode. This embodiment may provide higher resolution sensing and a greater density of alignment electrodes allowing for greater precision in the assembly process.

Figure 4:
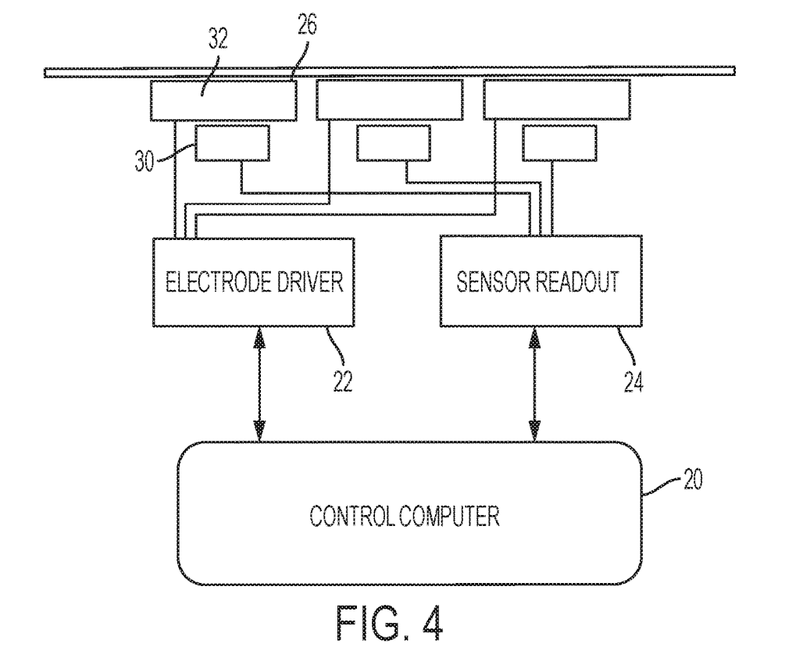
FIG. 4 shows a cross-sectional view of another embodiment of an integrated assembly plane and sensor network.

FIG. 4 shows a cross sectional view of the integrated assembly plane and sensor network. It also shows how the sensors and actuators, in this case the alignment electrodes, interface with a control computer. The control computer 20 receives information from the sensor readout 24 and analyzes it to determine the location of the chiplets. The electrode drivers 22 can then generate the fields, under control of the control computer 20, to maneuver the chiplets to the desired locations. The sensors, such as 30 reside under the electrodes such as 26. The electrodes may be transparent or may have an aperture such as 32 to allow the light to reach the sensors, such as 30.

Figure 5:
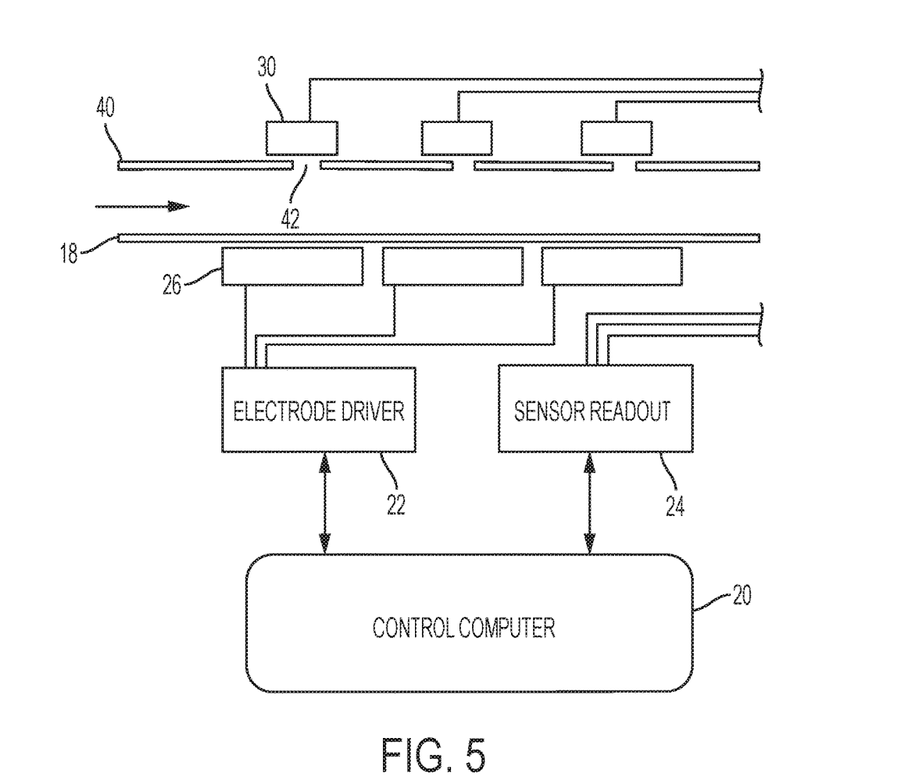
FIG. 5 shows an embodiment of a sensor network integrated above the actuation network.

FIG. 5 shows another embodiment, in which the sensor network resides on a surface opposite the assembly template surface 18. Individual sensors such as 30 reside opposite each electrode such as 26, and are separated from the flow of solution by a surface 40. The surface 40 has pinholes such as 42 that allow the sensors to "see" the chips. The size of the holes 42 may need to be small enough to prevent the solution from reaching the sensors. This approach reduces the complexity of the circuitry in the actuation plane but creates additional alignment challenges between the two planes, as well as challenges on introduction and removal of the chips to be aligned.

Figure 6:
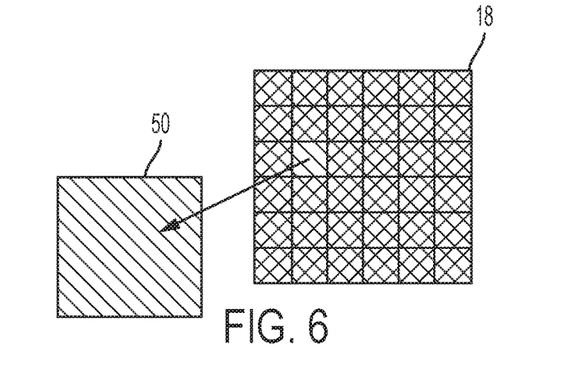
FIG. 6 shows an embodiment of an assembly template broken into blocks.

In another embodiment, which may be combined with any of the previous architectures. This embodiment integrates some control logic that interprets local sensor data and actuates the alignment electrodes as needed. Design rules programmed into the integrated control logic determine the actuation. In this embodiment, the system has the assembly template divided into blocks such as in FIG. 6. The template 18 has multiple blocks such as 50. Each block consists of an integrated alignment electrode array, sensor array and control logic unit.

Figure 7:
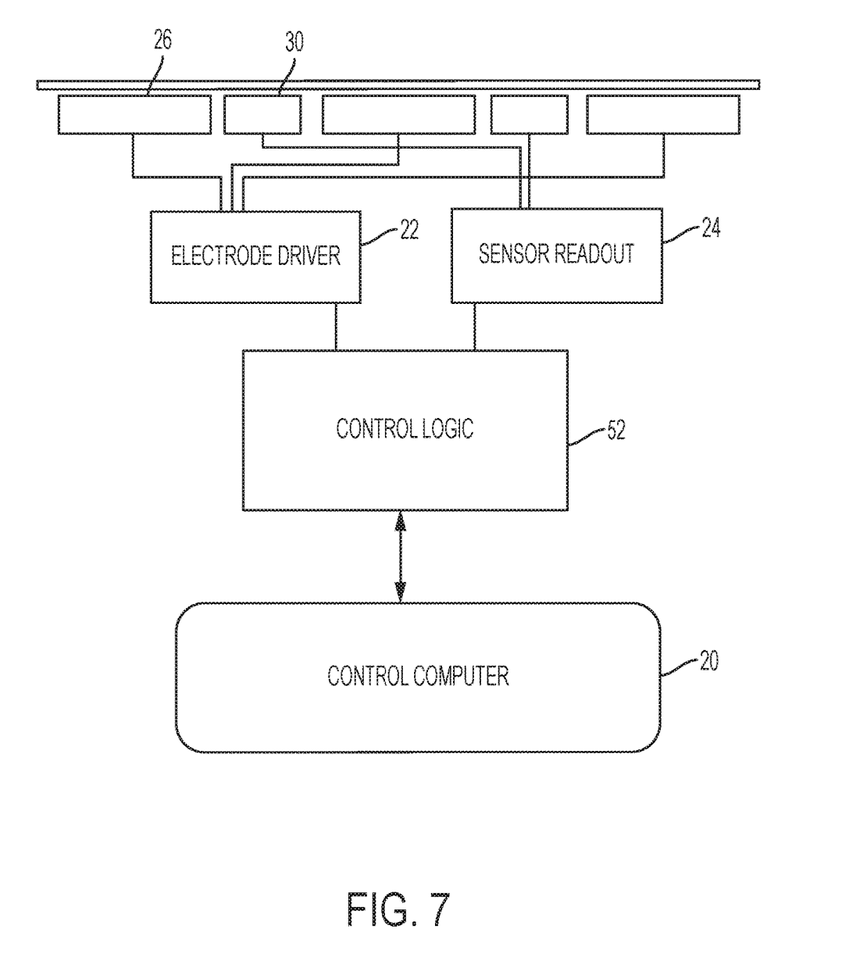
FIGS. 7 and 8 show cross-sectional diagrams of an integrated sensor, actuator and control logic alignment templates.
Figure 8:
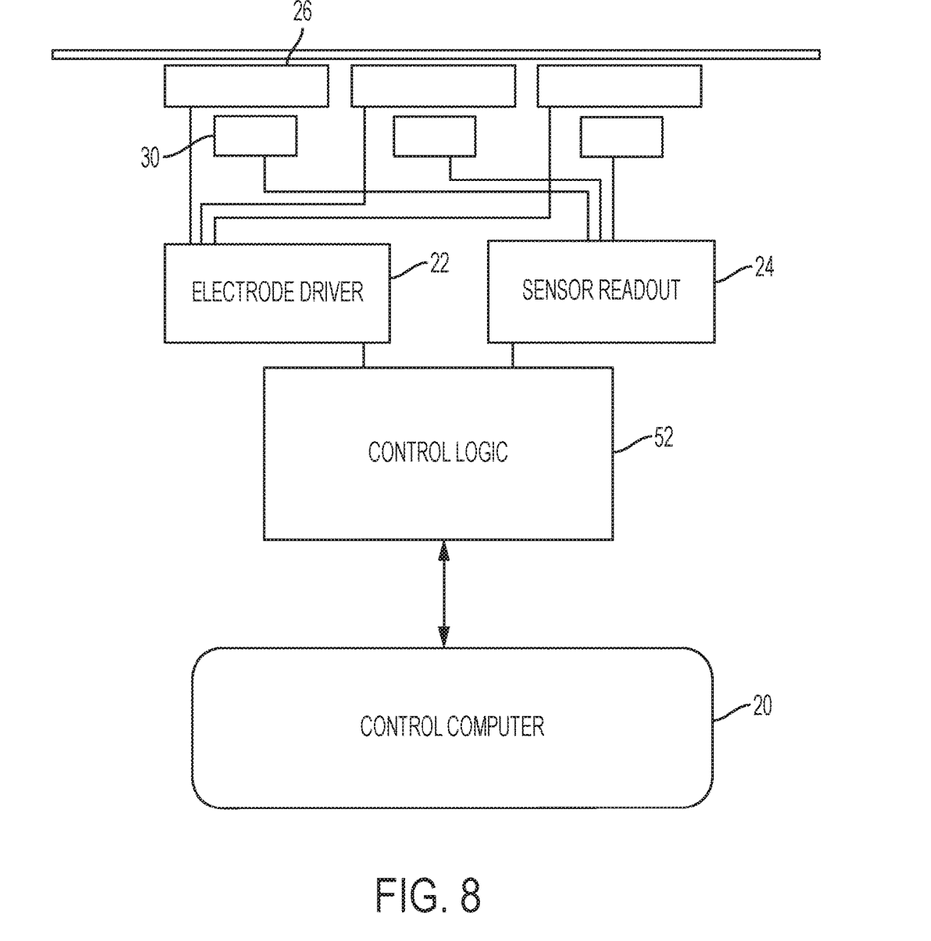

FIG. 7 shows a cross-sectional view of the block. The control logic unit 52 reads out the sensor data from the sensor readout 24 in its block, and actuates the alignment electrodes such as 26 in its block through the electrode driver 22. The control logic 52 communicates with neighboring block, as well as communicating with the control computer 20. FIG. 8 shows a cross-sectional view of the embodiments with the sensor below the electrodes and control logic 52.

Having seen various embodiments of the overall system architecture, the discussion now turns to operation and various control modes. The electrodes generate traveling waves that move the chiplets to the desired location. In FIGS. 9-19, the desired location is designated by the circles and the small, black squares represent chiplets. The control computer will tell the logic unit the desired location for the chiplet and actuate the electrodes. Actuation of the electrodes generates traveling waves shown as triangles to move the chiplets to the desired positions.

Figure 9:
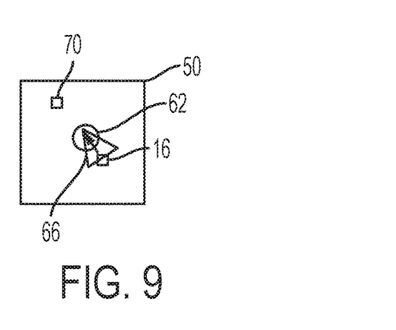
FIGS. 9-19 show different control examples based upon the relationships of chips and blocks.

In FIGS. 9-19, the block of interest will be labeled 50. If a chip is taken from an adjacent block, that block will be labeled 60. The number 62 designates the circle representing the desired location. In FIG. 9, block 50 has a desired location 62. Two chiplets 16 and 70 reside in the block. The control logic determines that the chiplet 16 lies closer to the desired location 62 rather than chiplet 70. It then generates a traveling wave 66 that moves the chiplet 16 to the desired location.

Figure 10:
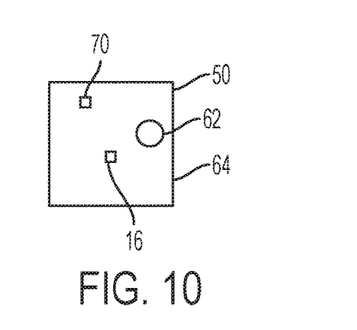
Figure 11:
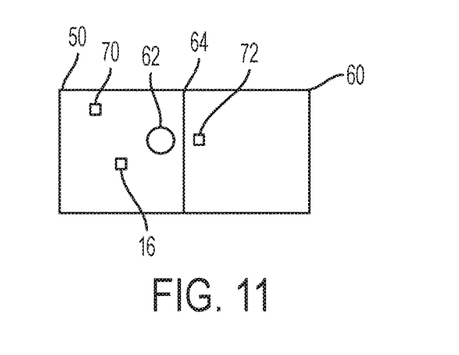
Figure 12:
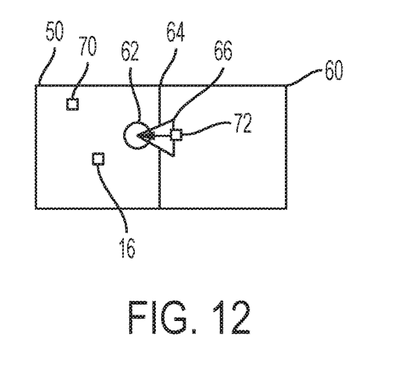
Figure 13:
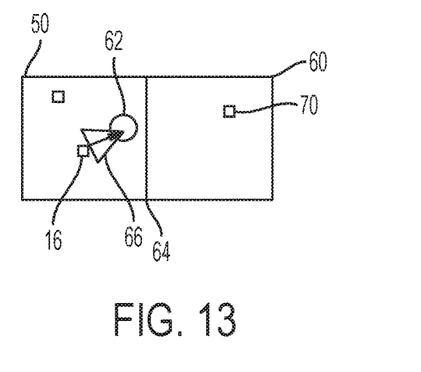

FIG. 10 shows a situation in which the desired location 62 is close to a boundary 64 of the block 50. Whether the desired location lies close to the block boundary or not may result from a comparison to a threshold or may just be closer to the boundary than the chip 16. As shown in FIG. 11, the chiplet 72 in the neighboring block 60 lies closer to the desired location than the chiplet in the block 50. FIG. 12 shows the traveling wave 66 generated to move the chiplet 72 to the desired location. In FIG. 13, the chiplet 16 lies closer to the desired 62 than any chiplets in the boundary, so the traveling wave 66 arises from the control logic associated with the block 50.

Figure 14:
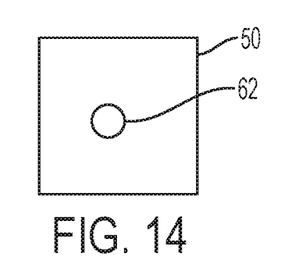
Figure 15:
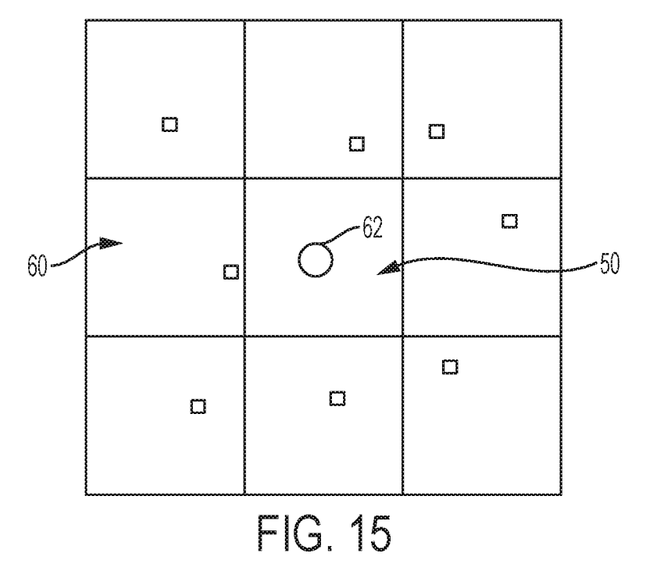
Figure 16:
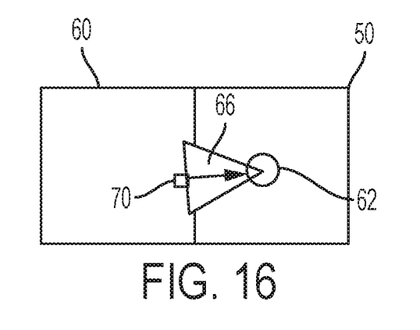

As shown in FIG. 14, the desired location 62 resides in a block 50 that that has no chiplets. In FIG. 15, the control logic for block 50 queries the neighboring blocks to block 50. The query results in identifying that chiplet 70 in neighboring block 60. FIG. 16 shows that the control logic for the neighboring block 60 generates the traveling wave 66 to move the chiplet to the desired location.

Figure 17:
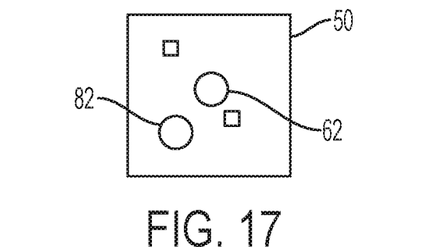
Figure 18:
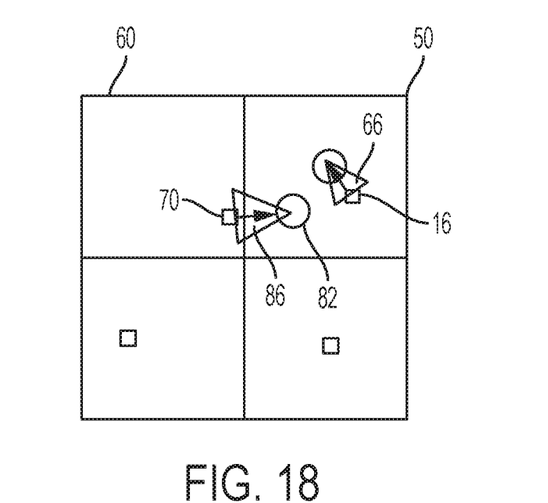
Figure 19:
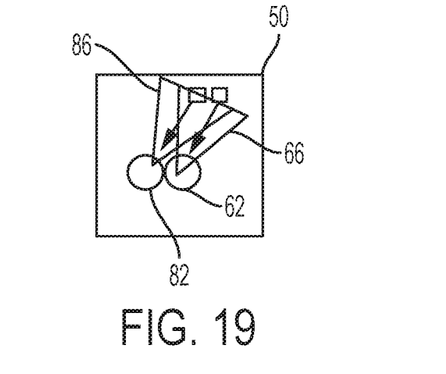

FIG. 17 shows an embodiment in which block 50 has two desired locations 62 and 82. As shown in FIG. 18, chiplet 16 will move to location 62 by traveling wave 66. Chiplet 70 from neighboring block 60 moves to the desired location moves to desired location 82 via traveling wave 86. Two different collisions may occur in a situation where two desired locations exists. While not shown here, the paths could collide, in which the control logic would actuate the chiplets sequentially. FIG. 19 shows a situation in which the paths may not collide but the waves may. As shown in FIG. 19, the two waves 66 and 86 collide. In order to maintain the needed precision, the two traveling waves may also have to occur sequentially.

In this manner, a microassembler can operate in a closed-loop system with real-time feedback. The sensor network provides immediate feedback as to the locations of the chiplets and the electrode array actuates them to the desired location.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A microassembler system, comprising:
   an alignment surface;
   a two-dimensional array of electrodes adjacent the alignment surface;
   a sensor network arranged adjacent the array of electrodes; and
   a control computer electrically connected to the array of electrodes and the sensor network, the control computer to receive signals from the sensor network indicating a position of at least one chiplet and to actuate the electrodes to change the position of the chiplet as needed based upon the signals.

2. The microassembler system of claim 1, wherein the sensor network is arranged interstitially with the array of electrodes.

3. The microassembler system of claim 1, wherein the sensor network is arranged below the array of electrodes.

4. The microassembler system of claim 1, wherein the sensor network is arranged above the array of electrodes with a gap between the alignment surface and the sensor network.

5. The microassembler system of claim 1, wherein alignment surface is divided into blocks.

6. The microassembler system of claim 3, wherein the electrodes are optically transparent.

7. The microassembler system of claim 3, wherein each electrode in the array of electrodes contains an aperture.

8. The microassembler system of claim 4, further comprising a shield between the gap and the optical sensor network.

9. The microassembler system of claim 5, wherein each block in the alignment surface corresponds to one or more of the electrodes in the electrode array, one or more of the sensors in the sensor unit, and each of an array of control logic units.

10. A method of assembling chiplets, comprising:
    receiving, at one of an array of control logic units, a signal from a control computer, the signal identifying an assembly location in a block of an assembly template at which a chiplet is to be located;
    determining, using a sensor corresponding to the control logic unit, a chiplet location of a nearest chiplet; and
    generating, using electrodes corresponding to the control logic unit, a traveling wave pattern to translate and orient the nearest chiplet to the location.

11. The method of claim 10, wherein determining the chiplet location comprises determining that a chiplet resides in the block.

12. The method of claim 10, wherein receiving the signal identifying the assembly location comprises identifying the assembly location as being closer to a boundary of the block than a chiplet.

13. The method of claim 12, wherein determining a chiplet location comprises:
    querying a block adjacent to the boundary of the block about any chiplets closer to the assembly location than chiplets in the block; and
    generating the traveling wave in the adjacent block to move a chiplet from the adjacent block to the assembly location when a chiplet in the adjacent block is closer than chiplets in the block.

14. A method of claim 12, wherein determining a chiplet location of a nearest chiplet comprises:
    determining that no chiplets reside in the block; and
    querying a plurality of neighboring blocks to determine a closest chiplet; and
    generating the traveling wave comprises generating the traveling wave from a neighbor block that has the closest chiplet to the assembly location.

15. The method of claim 12, wherein receiving a signal comprises receiving multiple signals identifying multiple assembly locations.

16. The method of claim 13, further comprising generating the traveling wave in the block to move a chiplet from the block to the assembly location, when a chiplet in the block is closer than any chiplets in the adjacent block.

17. The method of claim 15, wherein generating the traveling wave comprises generating multiple traveling waves and moving multiple chiplets in multiple paths.

18. The method of claim 17, wherein generating multiple waves comprises generating at least one wave from the block and at least one wave from a neighboring block.

19. The method of claim 17, wherein moving multiple chiplets in multiple paths comprises identifying at least two paths that collide, and wherein moving the multiple chiplets in multiple paths occurs sequentially.

20. The method of claim 18, wherein generating multiple waves comprises generating multiple waves that collide, and generating multiple waves occurs sequentially.

* * * * *